(12) United States Patent
Aoki et al.

(10) Patent No.: US 7,333,081 B2
(45) Date of Patent: Feb. 19, 2008

(54) IMAGE DISPLAY APPARATUS, DISPLAY UNIT DRIVER AND IMAGE DISPLAY METHOD FOR THE SAME

(76) Inventors: Hiroshi Aoki, c/o Hitachi, Ltd., Intellectual Property Group, New Marunouchi Bldg. 5-1, Marunouchi 1-chome, Chiyoda-ku, Tokyo 100-8220 (JP); Ryo Hasegawa, c/o Hitachi, Ltd., Intellectual Property Group New Marunouchi Bldg. 5-1, Marunouchi 1-chome, Chiyoda-ku, Tokyo 100-8220 (JP); Hirofumi Sakamoto, c/o Hitachi, Ltd., Intellectual Property Group, New Marunouchi Bldg. 5-1, Marunouchi 1-chome, Chiyoda-ku, Tokyo 100-8220 (JP); Haruki Takata, c/o Hitachi, Ltd., Intellectual Property Group New Marunouchi Bldg. 5-1, Marunouchi 1-chome, Chiyoda-ku, Tokyo 100-8220 (JP); Yasutaka Tsuru, c/o Hitachi, Ltd., Intellectual Property Group, New Marunouchi Bldg. 5-1, Marunouchi 1-chome, Chiyoda-ku, Tokyo 100-8220 (JP)

( * ) Notice: Subject to any disclaimer, the term of this patent is extended or adjusted under 35 U.S.C. 154(b) by 399 days.

(21) Appl. No.: 10/893,989

(22) Filed: Jul. 20, 2004

(65) Prior Publication Data
US 2005/0057486 A1 Mar. 17, 2005

(30) Foreign Application Priority Data
Aug. 27, 2003 (JP) ............................. 2003-303252

(51) Int. Cl.
*G09G 3/36* (2006.01)
(52) U.S. Cl. .................................................. 345/102
(58) Field of Classification Search .................. 345/50, 345/77, 102, 204
See application file for complete search history.

(56) References Cited

U.S. PATENT DOCUMENTS
6,111,559 A * 8/2000 Motomura et al. ......... 345/102

(Continued)

FOREIGN PATENT DOCUMENTS
JP          5-66501          3/1993

(Continued)

OTHER PUBLICATIONS

Chinese Office Action, dated Jan. 26, 2007, issued in corresponding CN Appln. No. 2004100708331.

*Primary Examiner*—Amr A. Awad
*Assistant Examiner*—Randal L Willis

(57) ABSTRACT

An object of the present invention is to provide an image display technology with which high contrast can be stably obtained.

In order to achieve the above object, the present invention changes the gain of a digital luminance signal by feeding back information on maximum and average luminance levels of the luminance signal, adjusts image contrast, and in accordance with the average luminance level detected from the feedback system, controls the illuminance of the backlight applied to a display unit. The control increases the illuminance of the backlight when the detected average luminance level is higher than the upper-limit value of a previously set reference range, and reduces the illuminance when the detected average luminance level is lower than the lower-limit value of the reference range.

12 Claims, 8 Drawing Sheets

U.S. PATENT DOCUMENTS

| | | |
|---|---|---|
| 6,300,921 B1 | 10/2001 | Moriconi et al. |
| 6,654,028 B1 * | 11/2003 | Yamakawa ................. 345/690 |
| 6,795,053 B1 * | 9/2004 | Funamoto et al. .......... 345/102 |
| 6,914,586 B2 * | 7/2005 | Burkhardt .................... 345/87 |
| 6,980,195 B2 * | 12/2005 | Lonoce et al. ............... 345/102 |
| 7,053,881 B2 * | 5/2006 | Itoh ............................ 345/102 |
| 2003/0016204 A1 * | 1/2003 | Lee ............................ 345/102 |
| 2003/0201968 A1 * | 10/2003 | Itoh et al. ................... 345/102 |
| 2004/0008177 A1 * | 1/2004 | Ahn ............................ 345/102 |
| 2005/0088402 A1 * | 4/2005 | Daly ........................... 315/102 |
| 2005/0104838 A1 * | 5/2005 | Sasaki ......................... 345/102 |

FOREIGN PATENT DOCUMENTS

| | | |
|---|---|---|
| JP | 2003-298974 | 10/2003 |
| WO | WO 02/102059 A1 | 12/2002 |

* cited by examiner

FIG. 3(a)

| NO. | MAX REGION | | | APL REGION | | | | GAIN | | |
|---|---|---|---|---|---|---|---|---|---|---|
| | (a) | (b) | (c) | (a) | (b) | (c) | (d) | REDUCE | HOLD | INCREASE |
| 1 | ○ | | | ○ | | | | ○ | | |
| 2 | ○ | | | | ○ | | | ○ | | |
| 3 | ○ | | | | | ○ | | | ○ | |
| 4 | ○ | | | | | | ○ | | | ☆ |
| 5 | | ○ | | ○ | | | | | ○ | |
| 6 | | ○ | | | ○ | | | | ○ | |
| 7 | | ○ | | | | ○ | | | ○ | |
| 8 | | ○ | | | | | ○ | | | ☆ |
| 9 | | | ○ | ○ | | | | | ○ | |
| 10 | | | ○ | | ○ | | | | | ○ |
| 11 | | | ○ | | | ○ | | | | ○ |
| 12 | | | ○ | | | | ○ | | | ○ |

FIG. 3(b)

| OPERATION | MARK | CONTROL |
|---|---|---|
| REDUCE | ○ | REDUCES THE GAIN. THE MINIMUM GAIN IS 0. |
| HOLD | ○ | HOLDS THE CURRENT GAIN. |
| INCREASE | ○ | INCREASES THE GAIN.<br>THE MAXIMUM GAIN IS A SERVICE ADJUSTMENT VALUE. |
| | ☆ | INCREASES THE CURRENT GAIN IF IT IS LESS THAN THE SPECIFIED VALUE.<br>HOLDS THE GAIN IF IT IS OVER THE SPECIFIED VALUE. |

IMAGE DISPLAY APPARATUS, DISPLAY UNIT DRIVER AND IMAGE DISPLAY METHOD FOR THE SAME

CLAIM OF PRIORITY

The present application claims priority from Japanese application serial no. P2003-303252, filed on Aug. 27, 2003, the content of which is hereby incorporated by reference into this application.

BACKGROUND OF THE INVENTION

The present invention relates to a technology for converting television signals and the analog video signals input from a personal computer or the like, into digital video signals, and thus displaying an image on a display unit such as a liquid-crystal panel.

Technologies related to the present invention include the technology disclosed in, for example, Japanese Patent Laid-open No. 5-66501 (Document 1). Document 1 describes a projection-type liquid-crystal display apparatus constructed so that it detects an average luminance of video signals per screen, modulates in response to the signal of the detected average luminance the video signal voltage to be applied to a liquid-crystal panel, and changes the luminance of a light source.

SUMMARY OF THE INVENTION

In an image display apparatus using a fixed pixel device such as a liquid-crystal panel, further improvement of contrast by enhancement of black in a low-luminance state and enhancement of contrast in a high-luminance state is desired to be realized for its stable operation. For example, the technology described in Document 1 employs the construction where the modulation of a video signal is merely changed in accordance with a feed-forward control system using detected-luminance information. Difficulty is therefore expected to occur in maintaining the luminance level of the luminance signal stably. Difficulty in achieving stable enhancement of contrast, coupled with the above, is also expected to arise.

In view of the related conventional technology, the present invention is intended to obtain stable high-contrast performance based on stable maintenance of luminance levels in an image display apparatus. That is to say, the present invention has been made in consideration of the problems associated with the above conventional technology, and an object of the invention is to provide a technology that allows image display with high picture quality.

In order to attain the above object, in the image display technology of the present invention, video contrast is adjusted by feeding back the maximum luminance level information and average luminance level (=average picture level: APL) information relating to a digital luminance signal and changes the gain of the luminance signal. Also, control is conducted to ensure that when the average luminance level (APL) detected from the above-mentioned feedback system is higher than the upper-limit value of a previously set reference range, the illuminance of the light applied from a backlight to the screen of a display unit is increased, and that when the average luminance level is lower than the lower-limit value of the reference range, the illuminance of the backlight is reduced.

More specifically, a display unit driver, image display apparatus, and image display method satisfying the above as its basic constituting requirements, is proposed as the present invention.

According to the present invention, high contrast can be stably obtained.

BRIEF DESCRIPTION OF THE DRAWINGS

FIGS. 3A and 3B are diagrams showing the relationships between divided luminance regions and gain control;

DETAILED DESCRIPTION OF THE PREFERRED EMBODIMENTS

Preferred embodiments of the present invention are described below with reference to the accompanying drawings.

Figure 1:
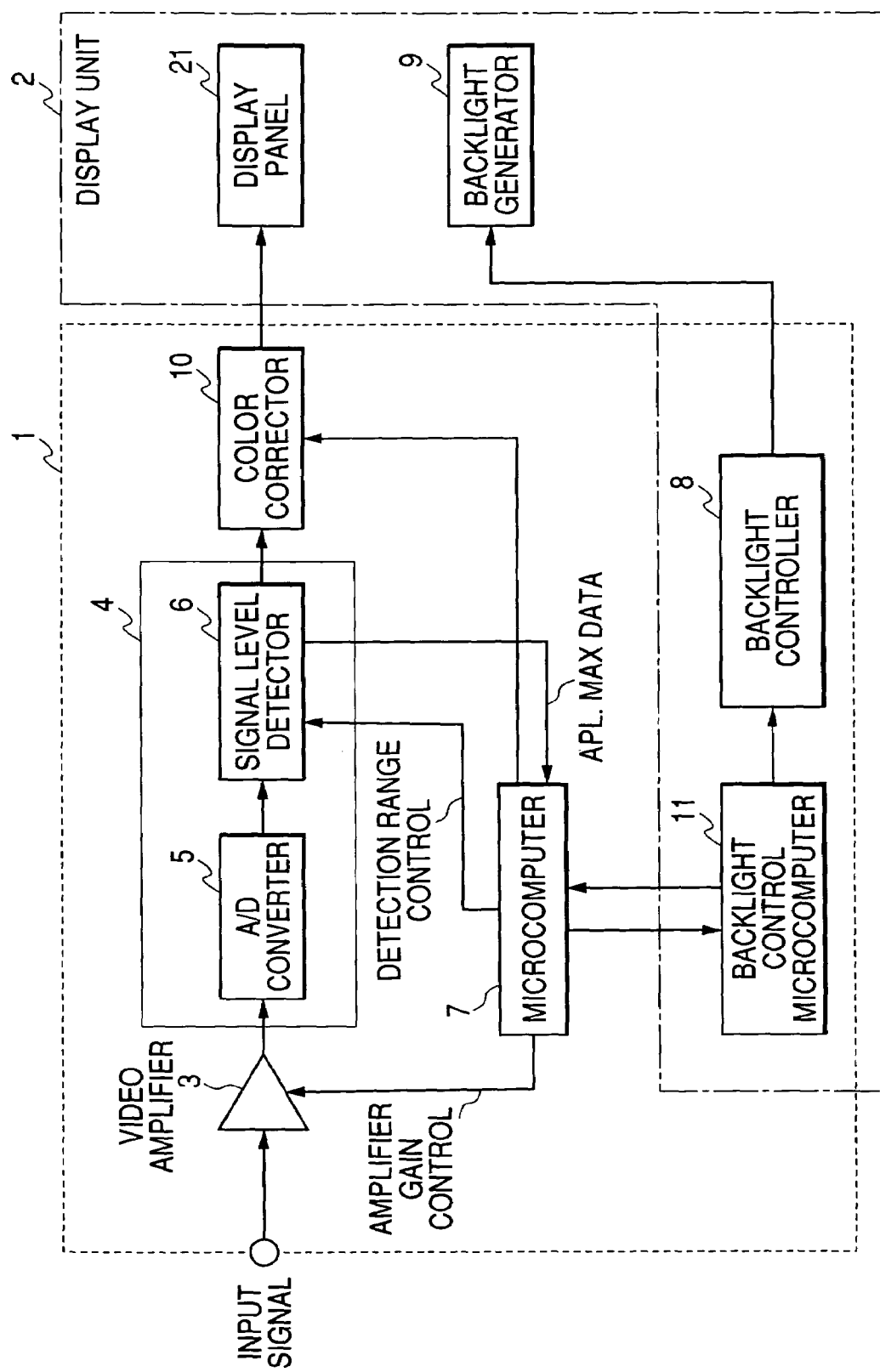
FIG. 1 is a basic configuration diagram of an image display apparatus according to a first embodiment of the present invention.
Figure 4:
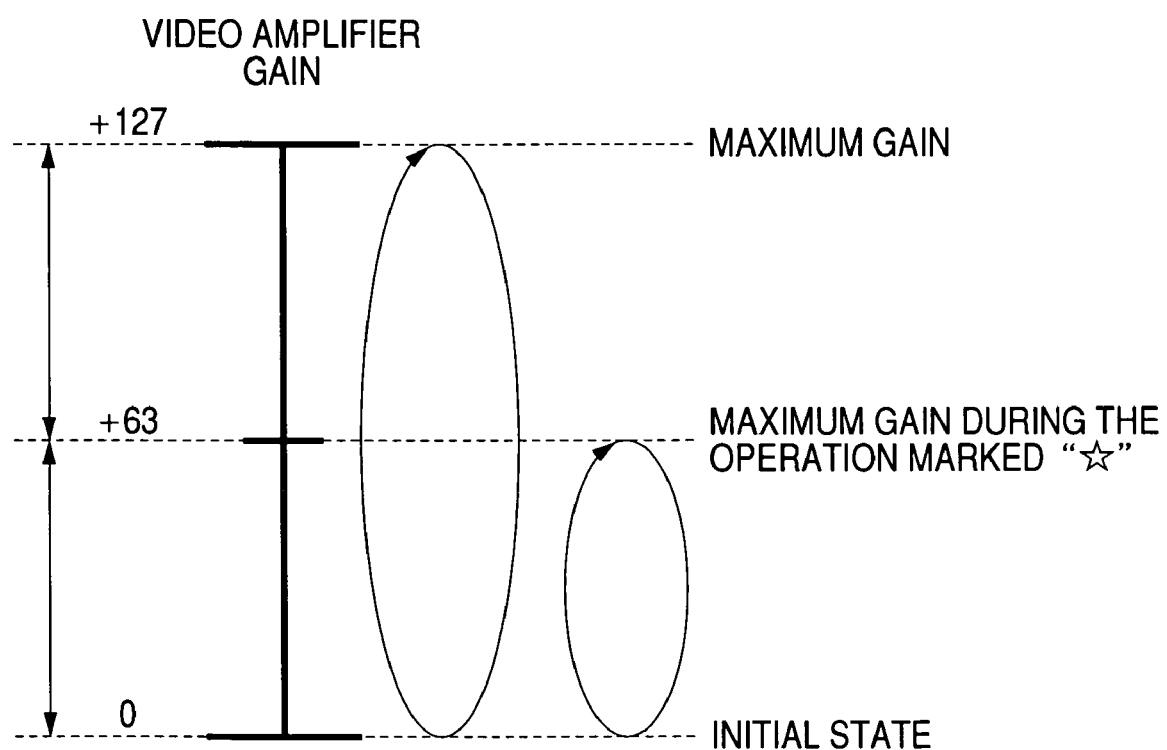
FIG. 4 is an explanatory diagram of the gain control range in contrast adjustment.
Figure 5:
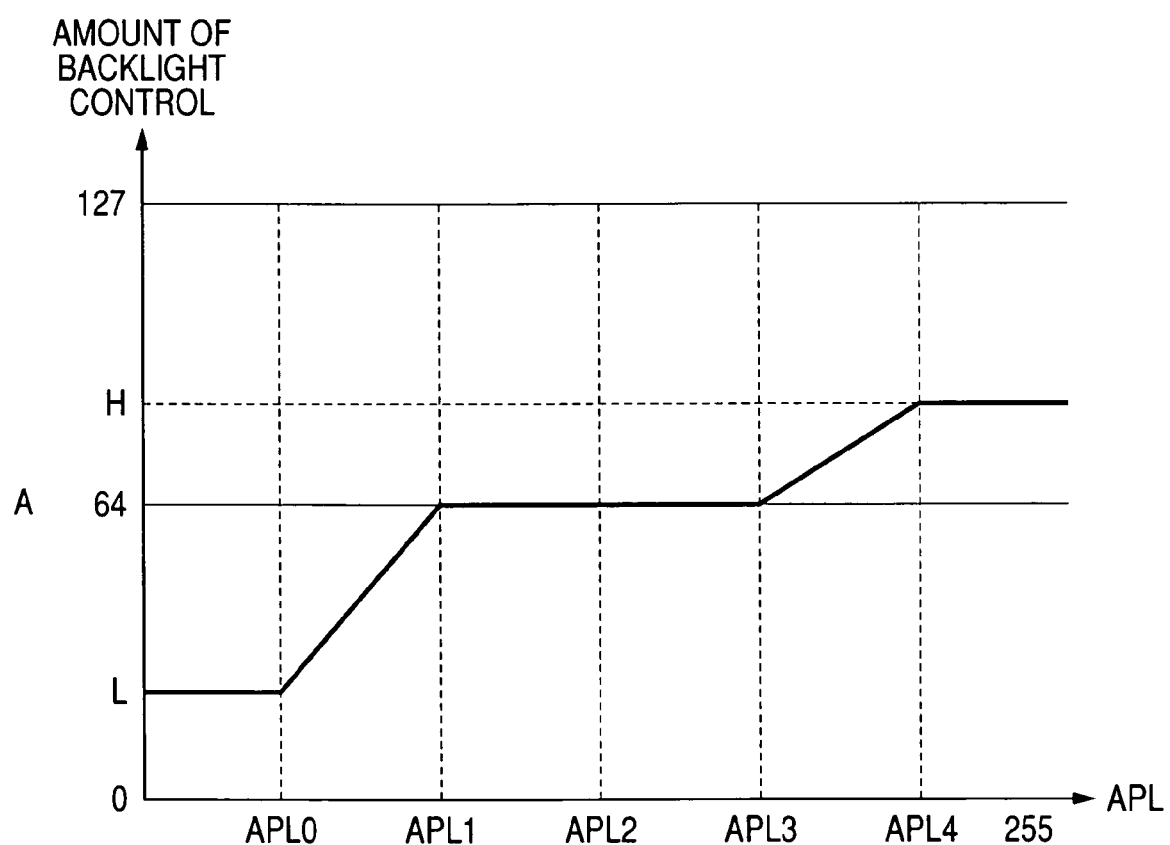
FIG. 5 is a diagram showing the relationship between an average luminance level and an amount of backlight correction.
Figure 6:
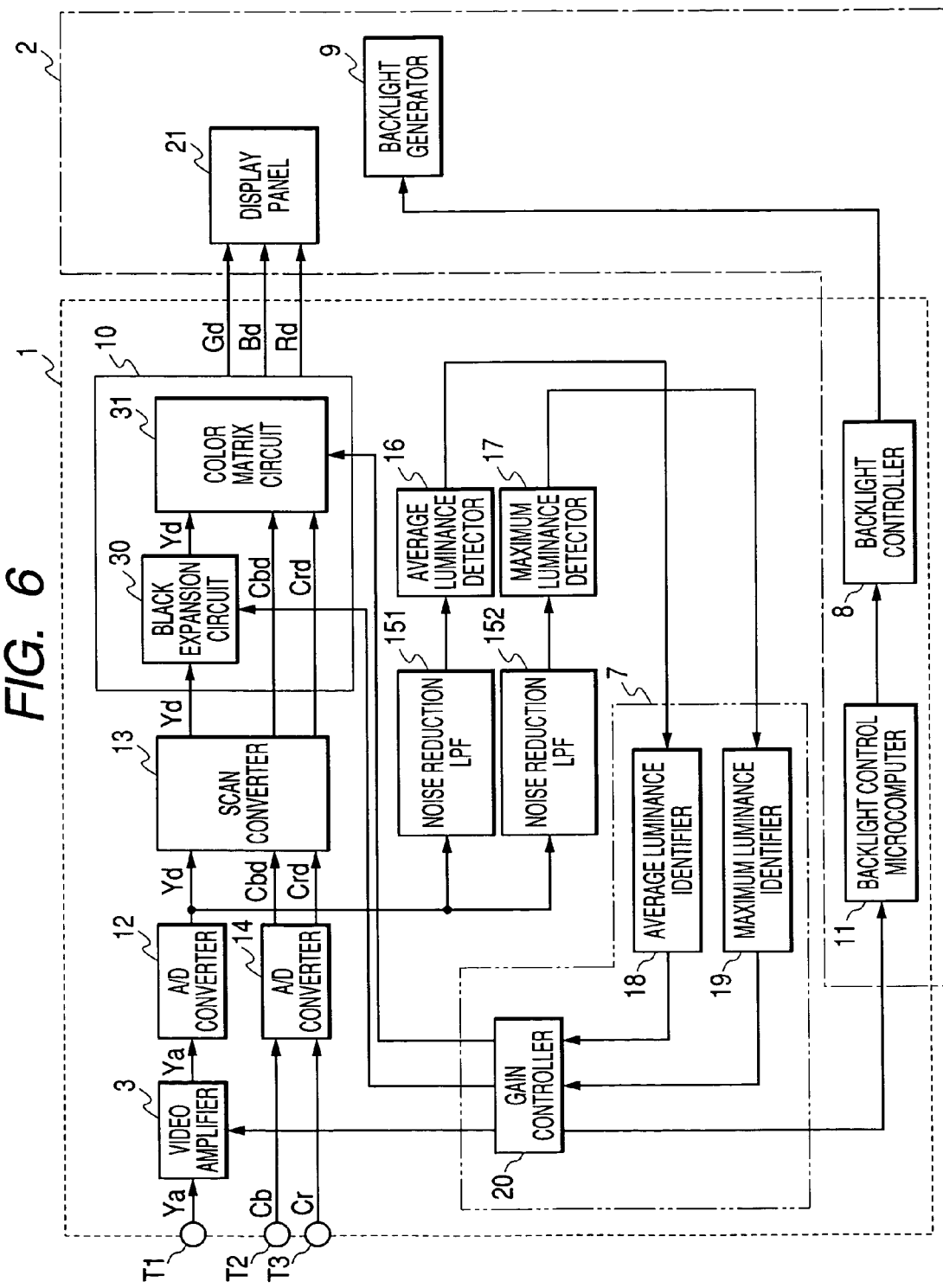
FIG. 6 is a diagram showing an example of circuit composition of the image display apparatus according to the first embodiment of the present invention.
Figure 7:
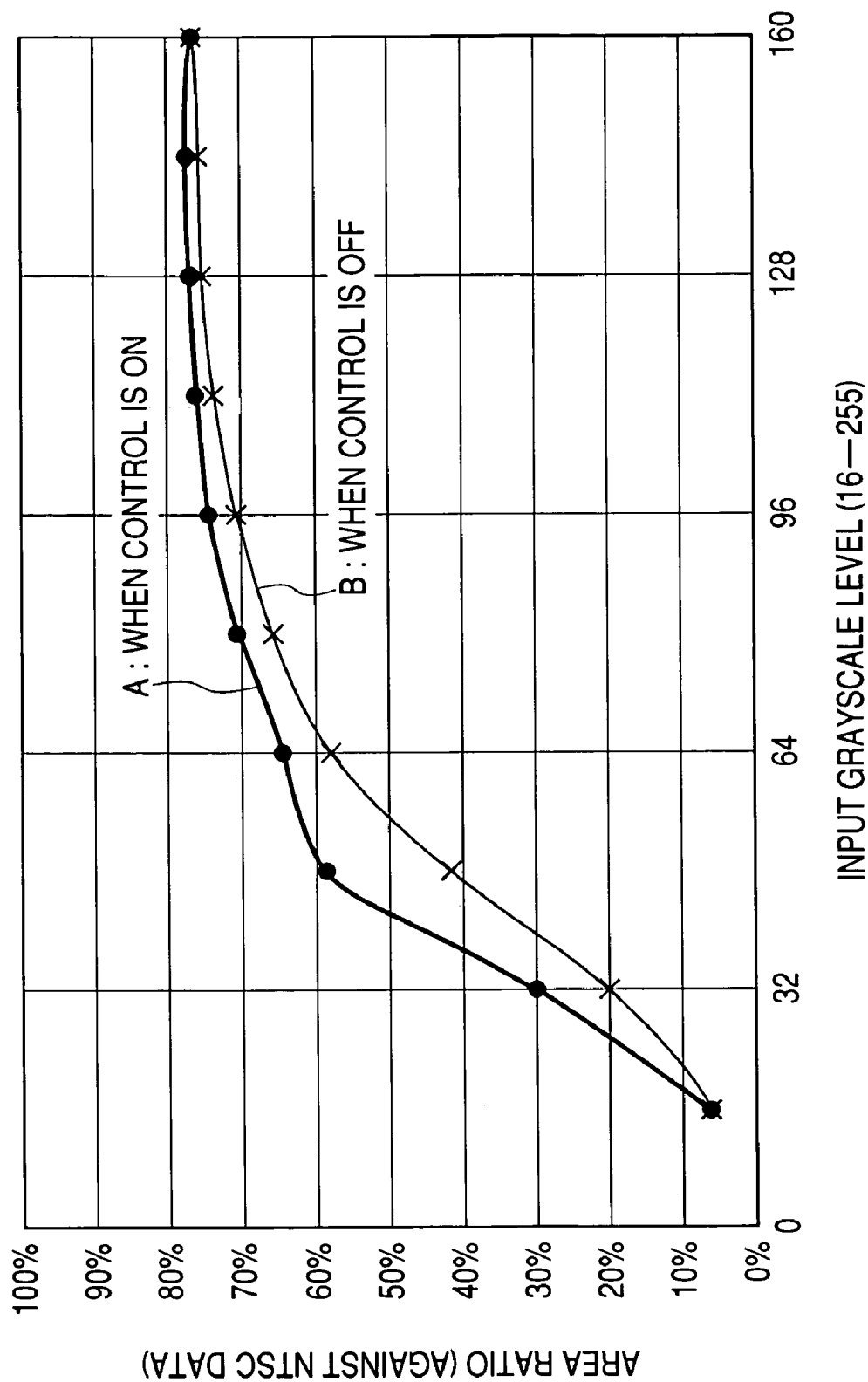
FIG. 7 is a diagram explaining the effects obtained in the first embodiment.

FIGS. 1 to 7 are diagrams explaining a first embodiment of the present invention. FIG. 1 is a basic configuration diagram of an image display apparatus according to the first embodiment of the invention, and FIGS. 2A and 2B are explanatory diagrams that show luminance region division of a maximum luminance level and that of an average luminance level, respectively. FIGS. 3A and 3B are diagrams showing the relationships between divided luminance regions and gain control, and FIG. 4 is an explanatory diagram of the gain control range in contrast adjustment. FIG. 5 is a diagram showing the relationship between an average luminance level and an amount of backlight correction, FIG. 6 is a diagram showing an example of circuit composition of the image display apparatus according to the first embodiment, and FIG. 7 is a diagram explaining the effects obtained in the first embodiment.

The first embodiment applies to an example in which: gain control of the analog luminance signal obtained before A/D conversion, and color correction of the digital chrominance signals obtained after the A/D conversion, are conducted in accordance with luminance region information of a maximum luminance level and an average luminance level (APL), and backlight control is conducted in accordance with the luminance region information of the average luminance level.

Referring to FIG. 1, symbol 1 denotes a display unit driver (driving circuit) for driving a display unit 2 (described below) by subjecting a video signal to contrast adjustment and backlight control. Symbol 2 denotes the display unit for displaying a color image using a backlight, symbol 3 a video amplifier for amplifying an input analog luminance signal, and symbol 4 a digital signal generator/luminance level detector. Symbol 5 denotes an A/D converter for converting an analog signal into a digital signal, and symbol 6 denotes a signal level detector functioning as a luminance level detector for detecting a maximum luminance level, and an average luminance level, of a digital luminance signal during a required period. Symbol 7 denotes a microcomputer functioning as a first microcomputer to identify luminance regions corresponding to the maximum luminance level and average luminance level detected, and form and output a control signal associated with judgment results. Symbol 10 denotes a color corrector (correction circuit) for correcting color density. Symbol 21 denotes a display panel such as a liquid-crystal display element or the like which is driven by a video signal and forms an image corresponding to the video signal. Symbol 9 denotes a backlight generator that generates the backlight applied to a screen for displaying a formed video signal. Symbol 8 denotes a backlight controller (control circuit) for controlling the backlight generator 9. Lastly, symbol 11 denotes a backlight control microcomputer functioning as a second microcomputer to control the backlight controller 8.

The video amplifier 3, the digital signal generator/luminance level detector 4, and the microcomputer 7 constitute a feedback control system and perform image contrast adjustments. The backlight control microcomputer 11 and the backlight controller 8 constitute a feed-forward control system and control the illuminance of the backlight. The backlight control microcomputer 11 performs, for example, an interpolation process on the information on a feedback-controlled average luminance level, input from the microcomputer 7, and thus forms a backlight control signal for conducting gentle control. The backlight controller 8 is controlled by the above-mentioned control signal of the backlight control microcomputer 11 and compares the feedback-controlled average luminance level with a value of a reference range by means of a comparator (not shown). When the average luminance level is higher than a value of the reference range, the backlight controller 8 increases the illuminance of the backlight generated from the backlight generator 9. When the average luminance level is lower than a value of the reference range, the backlight controller 8 provides control for reduced illuminance. It is assumed that the above value of the reference range is previously set and stored in a memory (not shown). The backlight control microcomputer 11 and the backlight controller 8 are provided, together with a display panel 21 and the backlight generator 9, inside the display unit 2. A connector, for example, is connected between the backlight control microcomputer 11 and the microcomputer 7. The display unit 2 is dismountable with respect to the main unit side of the apparatus that includes the microcomputer 7, video amplifier 3, and digital signal generator/luminance level detector 4.

The backlight control microcomputer 11 has a storage medium (not shown) such as a RAM, ROM, or like memory, in a built-in or externally installed state. Information on the display unit 2 is storable into the storage medium as an ID number thereof. The information includes: a model number of the display unit; the type thereof, such as a liquid-crystal panel type, plasma display panel (PDP) type, field emission display (FED) type, display type that applies backlight, or display type that does not irradiate backlight; the number of pixels; and other information.

For example, when the apparatus is powered on or when the display unit 2 is connected to the main unit of the apparatus by means of a connector or the like and the backlight control microcomputer 11 is connected to the microcomputer 7, the ID information within the above memory is read out and supplied to the microcomputer 7. The microcomputer 7 is adapted so that on the basis of the ID information input from the backlight control microcomputer 11, it can identify the type of display unit 2, the number of pixels, and the like, and perform control operations such as modifying the conditions set for the video amplifier 3, the color corrector 10, and the like. Thus, the display unit 2 and the main unit of the apparatus can be arbitrarily combined for usage even if they are different in type and specifications from each other.

If identification results by the microcomputer 7 indicate that the display unit 2 is of the configuration with a backlight, when contrast is adjusted by the feedback control system, the backlight control microcomputer 11 controls the illuminance of the backlight by controlling the backlight controller 8 in accordance with the average luminance level information. If identification results by the microcomputer 7 indicate that the display unit 2 is of the configuration without a backlight, that is, the image display apparatus is of a type that does not provided with a backlight, such as a PDP, the operation of the backlight controller 8 is turned off since the backlight control microcomputer 11 does not control the backlight controller. For example, after apparatus power-on or after the connection of the backlight control microcomputer 11 to the microcomputer 7, the above identification and control based on the ID information may be executed from the backlight control microcomputer 11 when the microcomputer 7 and the backlight control microcomputer 11 communicate with each other. Alternatively, the above identification and control may be executed at both the backlight control microcomputer 11 and the microcomputer 7.

Next, a description is given of the configuration where the ID information of the display unit 2 is used. Depending on the identification results indicating whether the display unit 2 is of the configuration with a backlight, output of a control signal to the backlight control microcomputer 11 may be turned on or off at the microcomputer 7 or output of a backlight control signal may be turned on or off at the backlight control microcomputer 11. Instead, output of the backlight controller may be set to an "on" or "off" state.

In the above configuration of FIG. 1, the input analog luminance signal, after being amplified by the video amplifier 3, is converted into a digital luminance signal by the A/D converter 5 and input to the signal level detector 6. The maximum luminance level and average luminance level of the digital luminance signal during, for example, a video period of one field or one frame are detected in the signal level detector 6. Two sets of information (signals) on the thus-detected maximum luminance level and average luminance level are input to the microcomputer 7. In the microcomputer 7, a luminance region to which the maximum luminance level corresponds, and a luminance region to which the average luminance level corresponds are identified from the input maximum luminance level and average luminance level information, and a control signal based on identification results is formed and output. The control signal is input to the video amplifier 3, the backlight control microcomputer 11, and the color corrector 10. The control signal that has been input as an amplifier gain control signal to the video amplifier 3 controls an amplifier gain of the analog luminance signal in the video amplifier 3. When the amplifier gain of the analog luminance signal is controlled, the digital luminance signal that was obtained by A/D conversion changes in gain. The change in gain causes contrast to be adjusted. The digital luminance signal that changed in gain is further input to the color corrector, in which digital chrominance signals associated with the gain change are color-corrected. Contrast-adjusted and color-corrected digital video signals are input to the display panel 21 of the display unit 2, thus forming a color image. The color corrector 10 has a black expansion circuit (not shown) that performs a black expansion process on the digital luminance signal, and a color matrix circuit (not shown) that converts the digital luminance signal and the digital chrominance (color difference) signals into digital video signals for red (R), green (G), and blue (B). The black expansion circuit performs a black expansion process based on luminance region information relating to the average luminance level, and the color matrix circuit performs color corrections (color density control).

Meanwhile, backlight control is conducted using the control signal that is input from the microcomputer 7 to the backlight control microcomputer 11. A signal for backlight control is formed from the control signal that is input to the backlight control microcomputer 11. The backlight control signal includes the feedback-controlled average luminance level information mentioned above, and is a gentle signal of a long cycle time compared with that of the control signal from the microcomputer 7. The backlight control signal is input to the backlight controller 8. The backlight controller 8 compares the average luminance level with a value of a previously set reference range. If the average luminance level is higher than an upper-limit value of the reference range, the illuminance of the backlight generated from the backlight generator 9 is increased. Video contrast is thus enhanced using the contrast-adjusted and color-corrected digital video signals mentioned above. Conversely, if the average luminance level is lower than a lower-limit value of the reference range, the backlight controller 8 reduces the above illuminance, thus enhancing black. The backlight control microcomputer 11 and the microcomputer 7 communicate with each other. Prior to the above increasing/reducing operation for the illuminance of the backlight, at least one of the two microcomputers (7, 11) can determine whether the display unit 2 is configured to have the backlight generator 9 therein.

Figure 2A:
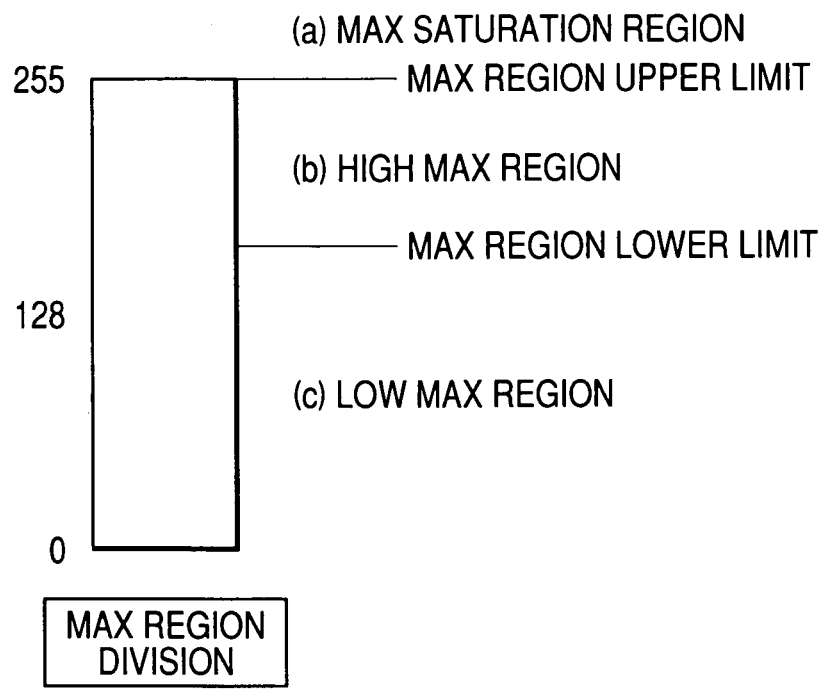
FIGS. 2A and 2B are explanatory diagrams that show luminance region division of a maximum luminance level and that of an average luminance level, respectively.
Figure 2B:
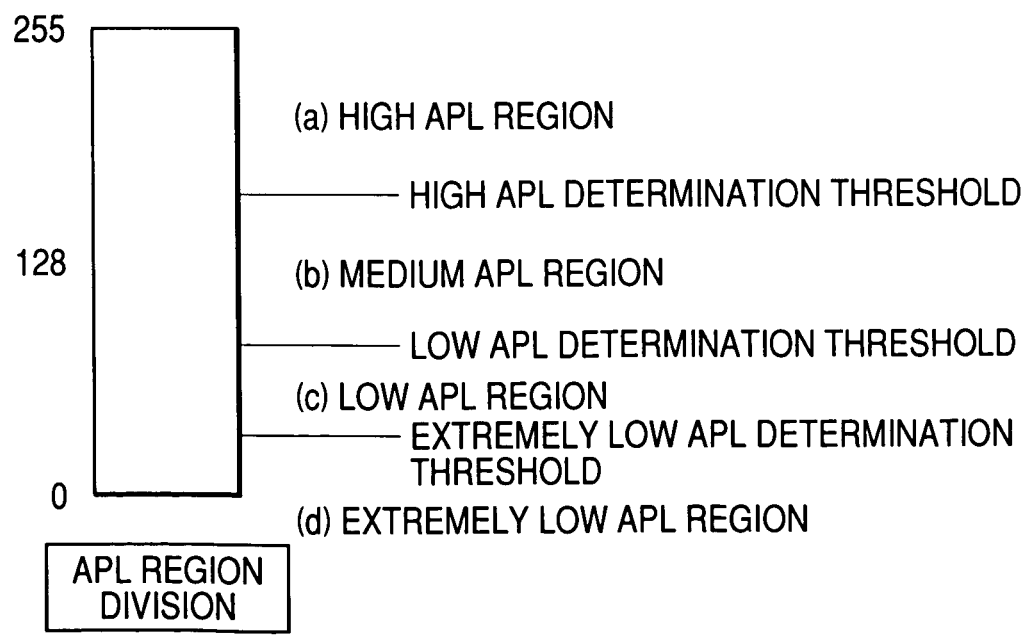

FIGS. 2A and 2B are explanatory diagrams that show a luminance region division of a maximum luminance level and that of an average luminance level, respectively, wherein FIG. 2A relates to the maximum luminance level and FIG. 2B relates to the average luminance level. As shown in FIG. 2A, the maximum luminance level has its region divided into, for example, three maximum luminance regions, with a maximum grayscale level of 255 as its upper limit for an eight-bit A/D converter. The three maximum luminance regions refer to saturation luminance region (a) [MAX saturation region], high-luminance region (b) [high MAX region], and low-luminance region (c) [low MAX region]. Saturation luminance region (a) [MAX saturation region] is a luminance region exceeding an upper limit of the maximum luminance level. High-luminance region (b) [high MAX region] is a luminance region ranging from a lower limit of the maximum luminance level to the upper limit thereof. Low-luminance region (c) [low MAX region] is a luminance region ranging from a minimum grayscale level 0 to the lower limit of the maximum luminance level. Also, as shown in FIG. 2B, the average luminance level has its region divided into, for example, four average luminance regions from a maximum grayscale level 255 to a minimum grayscale level 0 when the A/D converter is of the eight-bit type. The four average luminance regions refer to high average luminance region (a) [high APL region], medium average luminance region (b) [medium APL region], low average luminance region (c) [low APL region], and extremely low average luminance region (d) [extremely low APL region]. To which of the above luminance regions the maximum luminance level and average luminance level that were detected by the signal level detector 6 of FIG. 1 each correspond is identified by the microcomputer 7.

FIGS. 3A and 3B show examples of the relationships between the divided luminance regions in FIGS. 2A and 2B, and gains. FIG. 3A shows examples of 12 combinations of the maximum luminance level and average luminance level in each of the respective luminance regions. FIG. 3A also shows control directions of gain in each such combination. FIG. 3B shows details of gain control. In FIG. 3A, "No. 1" to "No. 4" apply when the maximum luminance level is within saturation luminance region (a) [MAX saturation region]. Likewise, "No. 5" to "No. 8" apply when the maximum luminance level is within high-luminance region (b) [high MAX region], and "No. 9" to "No. 12" apply when the maximum luminance level is within low-luminance region (c) [low MAX region]. For "No. 1" and "No. 2", the respective maximum luminance levels are within saturation luminance region (a) [MAX saturation region], and the respective average luminance levels are within high average luminance region (a) [high APL region] and within medium average luminance region (b) [medium APL region]. In these combinations, therefore, the microcomputer 7 conducts control with this contrast-adjusting function so that, for example, if a gain of the video amplifier 3 has been increased, the gain is reduced to prevent screen saturation. For "No. 3", even when the maximum luminance level is within saturation luminance region (a) [MAX saturation region], since the average luminance level is within low average luminance region (c) [low APL region], the microcomputer 7 conducts control to hold, for example, the gain of the video amplifier 3. For "No. 4", even when the maximum luminance level is within saturation luminance region (a) [MAX saturation region], since the average luminance level is within extremely low average luminance region (d) [extremely low APL region], the microcomputer 7 conducts control to increase, for example, the gain of the video amplifier 3. For "No. 5" to "No. 7", the respective maximum luminance levels are within high-luminance region (b) [high MAX region], and the respective average luminance levels are within high average luminance region (a) [high APL region], within medium average luminance region (b) [medium APL region], and within low average luminance region (c) [low APL region]. In these combinations, therefore, the microcomputer 7 conducts control to hold, for example, the gain of the video amplifier 3. For "No. 8", even when the maximum luminance level is within high-luminance region (b) [high MAX region], since the average luminance level is within extremely low average luminance region (d) [extremely low APL region], the microcomputer 7 conducts control to increase, for example, the gain of the video amplifier 3. For "No. 9", even when the maximum luminance level is within low-luminance region (c) [low MAX region], since the average luminance level is within high average luminance region (a) [high APL region], the microcomputer 7 conducts control to hold, for example, the gain of the video amplifier 3. For "No. 10" to "No. 12", the respective maximum luminance levels are within low-luminance region (c) [low MAX region], and the respective average luminance levels are within medium average luminance region (b) [medium APL region], within low average luminance region (c) [low APL region], and within extremely low average luminance region (d) [extremely low APL region]. Therefore, the microcomputer 7 conducts control to increase, for example, the gain of the video amplifier 3. In the above, the maximum limit of gain reduction is down to a previously set initial value.

FIG. 4 is an explanatory diagram of the gain control range in the above contrast adjustment. In FIG. 4, the gain is divided into 128 levels from 0 to 127 as an example of the gain control range. The gain is increased/reduced within the range, for example, from a maximum value of the gain of the video amplifier 3 to an initial value of the gain. The gain control range is switched differently between the "No. 4" or "No. 8" combination in FIG. 3A and other combination conditions. In the "No. 4" or "No. 8" combination in FIG. 3A, the control range of the gain is made narrower than that of other conditions. In the above combination, the gain is increased, regardless of the maximum luminance level detected. For this reason, such narrowing is provided to suppress image saturation (collapse of white) due to an excessive increase in the gain.

FIG. 5 is a diagram explaining the relationship between a backlight control based average luminance level and an amount of backlight control (an amount of backlight correction). The apparatus components of FIG. 1 in the description given below are each assigned the same symbol as used in FIG. 1.

In FIG. 5, the range of average luminance levels from APL1 to APL4 is taken as a reference range, and a standard amount of backlight correction is associated with each of the average luminance levels. If identification results by the backlight control microcomputer 11 indicate that the average luminance level (APL) of a digital luminance signal, detected by the signal level detector 6 in the feedback system, is within the reference range, the backlight is not increased or reduced in illuminance. If the average luminance level (APL) detected of the digital luminance signal is higher than upper-limit value APL3 of the reference range, the above amount of backlight correction is increased above its standard value by the backlight controller 8 to increase the illuminance of the backlight emitted from the backlight generator 9. If the average luminance level (APL) detected of the digital luminance signal is even higher than APL4, the amount of backlight correction is increased to a substantially constant high level (level H). If the average luminance level (APL) detected of the digital luminance signal is lower than lower-limit value APL1 of the reference range, the amount of backlight correction is reduced below its standard value to reduce the illuminance of the backlight. If the average luminance level is even lower than APL0, the amount of backlight correction is reduced to a substantially constant low level (level L). Gentle, stable backlight control can be achieved by providing the reference range from APL1 to APL3 and when the average luminance level detected is within the APL1-APL3 reference range, keeping the illuminance of the backlight unchanged.

FIG. 6 is a diagram showing an example of circuit composition of the image display apparatus according to the first embodiment, with this example embodying the display unit driver included in the above configuration of FIG. 1. Referring to FIG. 6, symbol 1 denotes the display unit driver, symbol 2 the display unit, symbol 3 the video amplifier, and symbol 12 an A/D converter for converting an analog luminance signal Ya that has been amplified by the video amplifier 3, into a digital luminance signal Yd. Symbol 13 denotes a scan converter for converting an input signal into signal timing in which the input signal can be displayed at the display unit 2. Symbol 14 denotes an A/D converter for converting input analog chrominance (color difference) signals Cb and Cr into digital chrominance (color difference) signals Cbd and Crd, respectively. Symbols 151 and 152 each denote a noise reduction low-pass filter (LPF) for reducing a noise level of the digital luminance signal Yd obtained by the above A/D converter 12. Symbol 16 denotes an average luminance detector for detecting an average luminance level (APL) of an output signal (digital luminance signal) of the noise reduction LPF 151 during a required period, e.g., one frame or one field. Symbol 17 denotes a maximum luminance detector for detecting a maximum luminance level of an output signal (digital luminance signal) of the noise reduction LPF 152 during a required period, e.g., one frame or one field. Symbol 18 denotes an average luminance identifier operative to receive information (a signal) on the average luminance level detected by the average luminance detector 16, and to identify a luminance region to which the average luminance level corresponds. Symbol 19 denotes a maximum luminance identifier operative to receive information (a signal) on the maximum luminance level detected by the maximum luminance detector 17, and identifying a luminance region to which the maximum luminance level corresponds. Symbol 20 denotes a gain controller that forms a signal for controlling a gain or the like of the video amplifier 11 in accordance with information on the corresponding luminance region of the above average luminance level and on the corresponding luminance region of the above maximum luminance level. Symbol 30 denotes a black expansion circuit for performing a black expansion process, and symbol 31 denotes a color matrix circuit for converting the digital luminance signal Yd and the digital chrominance (color difference) signals Cbd and Crd into digital video signals Rd, Gd, and Bd, for red (R), green (G), and blue (B), respectively. Symbol T1 denotes an input terminal for the analog luminance signal Ya, and symbols T2 and T3 denote input terminals for the analog chrominance (color difference) signals Cb and Cr, respectively. Symbol 7 denotes the microcomputer, symbol 21 the display panel, symbol 9 the backlight generator, symbol 8 the backlight controller, and symbol 11 the backlight control microcomputer. Of the above elements, the average luminance identifier 18, the maximum luminance identifier 19, and the gain controller 20 constitute the microcomputer 7. Also, the A/D converters 12, 14, the scan converter 13, the noise reduction LPFs 151, 152, the average luminance detector 16, the maximum luminance detector 17, the black expansion circuit 30, and the color matrix circuit 31 constitute, for example, large-scale integration (LSI).

In the configuration of FIG. 6, the analog luminance signal Ya from the input terminal T1 is amplified by the video amplifier 11 and then converted into the digital luminance signal Yd by the A/D converter 12. The digital luminance signal Yd is input to the scan converter 13 and then input to the noise reduction LPFs 151, 152. After being noise-reduced in the noise reduction LPFs 151, 152, the digital luminance signal Yd is further input to the average luminance detector 16 and the maximum luminance detector 17. In the average luminance detector 16, an average luminance level during a required period is detected, and in the maximum luminance detector 16, a maximum luminance level during the required time is detected. Information on the thus-detected average luminance level and that of the detected maximum luminance level are input to the average luminance identifier 18 and the maximum luminance identifier 19, respectively. In the average luminance identifier 18, a luminance region to which the detected average luminance level corresponds is identified, and in the maximum luminance identifier 19, a luminance region to which the detected maximum luminance level corresponds is identified. More specifically, to which of the four average luminance regions in FIG. 2B the detected average luminance level, for example, corresponds is identified. That is, it is identified whether the detected average luminance level corresponds to high average luminance region (a) [high APL region], medium average luminance region (b) [medium APL region], low average luminance region (c) [low APL region], or extremely low average luminance region (d) [extremely low APL region]. To which of the three maximum luminance regions in FIG. 2A the detected maximum luminance level corresponds is also identified. That is, it is identified whether the detected maximum luminance level corresponds to saturation luminance region (a) [MAX saturation region], high-luminance region (b) [high MAX region], or low-luminance region (c) [low MAX region]. Information on the identified corresponding luminance region of the average luminance level and on the identified corresponding luminance region of the maximum luminance level are input to the gain controller 20. The average luminance level that has been used for the luminance region identification is also input from the average luminance identifier 18. Based on the above luminance region information and average luminance level, first, second, and third control signals are formed in the gain controller 20. The first control signal is used to adjust contrast by controlling a gain of the video amplifier 3. This control signal is formed in accordance with, for example, information on a combination of the corresponding luminance region of the detected average luminance level and the corresponding luminance region of the detected maximum luminance level (see FIG. 3A). The second control signal is input to the black expansion circuit 30 and used for black expansion, and this control signal is formed on the basis of the detected average luminance level. The third control signal is input to the color matrix circuit 31 and used for density correction of digital chrominance (color difference) signals, and this control signal is formed on the basis of the gain for contrast adjustment with the above first control signal.

Meanwhile, the analog chrominance (color difference) signals Cb and Cr that were input from the input terminals T2 and T3, respectively, are converted into the digital chrominance (color difference) signals Cbd and Crd, respectively, by the A/D converter 14. As with the digital luminance signal Yd, the digital chrominance (color difference) signals Cbd and Crd are also input to the scan converter 13 and pixel-converted. The digital luminance signal Yd, after being output from the scan converter 13, is input to the black expansion circuit 30, in which the signal is then black-expanded in a state controlled by the above second control signal. The black-expanded digital luminance signal Yd is further input to the color matrix circuit 31. The digital chrominance (color difference) signals Cbd and Crd output from the scan converter 13 are also input to the color matrix circuit 31. In the matrix circuit 31, the digital chrominance (color difference) signal Yd and the digital chrominance (color difference) signals Cbd and Crd are converted into digital video signals Rd, Gd, and Bd, for red (R), green (G), and blue (B), respectively, and then output. The thus-output digital video signals Rd, Gd, and Bd are input to the display panel 21 of the display unit 2, thus forming a color image.

The construction and operation of backlight control are the same as in FIG. 1. That is, the backlight control microcomputer 11 forms a backlight control signal, subject to the control signal input from the microcomputer 7. The backlight control signal is input to the backlight controller 8. The backlight controller 8 compares an average luminance level with a value of a previously set reference range. If the average luminance level is higher than an upper-limit value of the reference range, the backlight controller 8 increases an illuminance of the backlight generated from the backlight generator 9. Video contrast is thus enhanced using the contrast-adjusted and color-corrected digital video signals mentioned above. Conversely, if the average luminance level is lower than a lower-limit value of the reference range, the backlight controller 8 enhances black by reducing the above illuminance. The backlight control microcomputer 11 and the microcomputer 7 communicate with each other. Prior to the above increasing/reducing operation for the illuminance of the backlight, at least one of the two microcomputers (7, 11) identifies whether the display unit 2 has the backlight generator 9 therein.

FIG. 7 is a diagram explaining the effects obtained in the first embodiment.

Curve A in FIG. 7 represents measurements of the area ratios between color purity characteristics with respect to input grayscale levels at which the contrast adjustment, backlight control, and color correction processes in the configurations of FIGS. 1 and 6 were all conducted (i.e., with control turned on). Curve B represents the measurements that were obtained when none of the contrast adjustment, backlight control, and color correction processes was conducted (i.e., with control turned off). A liquid-crystal panel is used as the display panel. The above results indicate, in a range of input grayscale levels up to about 100, a relatively large increment in the area ratio of characteristics A with respect to characteristics B, and hence indicate that the effects obtained in the first embodiment are significant.

According to the above first embodiment, high contrast can be stably obtained. An image with a suppressed decrease in the density of color and with black enhanced by the black expansion process can also be obtained.

Figure 8:
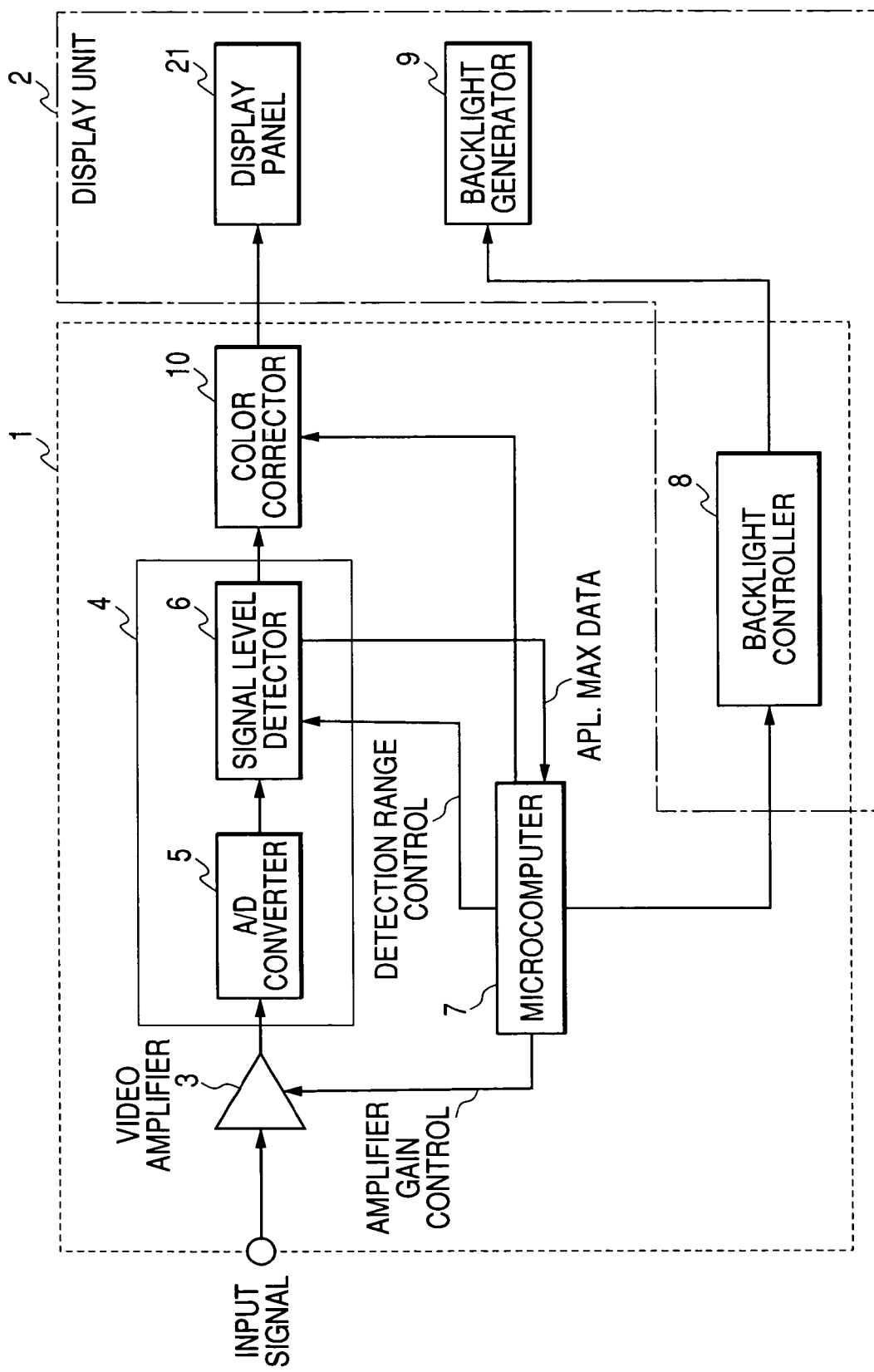
FIG. 8 is a basic configuration diagram of an image display apparatus according to a second embodiment of the present invention.

FIG. 8 is a basic configuration diagram of an image display apparatus according to a second embodiment of the present invention. This configuration, unlike that of the first embodiment shown in FIG. 1, does not include a backlight control microcomputer. Except in this respect, the configuration of the second embodiment is the same as that of the first embodiment.

In the configuration diagram of FIG. 8, a backlight controller 8 implements backlight control by controlling a backlight generator 9 by use of a control signal sent from a microcomputer 7. The backlight controller 8, as with that of FIG. 1, first compares an average luminance level with a value of a previously set reference range. If the average luminance level is higher than an upper-limit value of the reference range, the backlight controller 8 enhances video contrast by use of digital video signals by increasing an illuminance of the backlight generated from the backlight generator 9. Conversely, if the average luminance level is lower than a lower-limit value of the reference range, the backlight controller 8 enhances black by reducing the illuminance of the backlight. Prior to the above increasing/reducing operation for the illuminance of the backlight, the microcomputer 7 identifies whether a display unit 2 has the backlight generator 9 therein. Contrast adjustments and color corrections are performed in a manner similar to that of the first embodiment.

According to the second embodiment, as with the first embodiment, high contrast can be stably obtained. Ann image with a suppressed decrease in the density of color and with black enhanced by the black expansion process can also be obtained.

Although the above embodiments have, in the display unit 2, a backlight control microcomputer 11, a backlight controller 8, and/or other elements, the present invention is not limited by the embodiments and permits these elements to be provided outside the display unit 2. Additionally, although, in the above embodiments, gain control of a luminance signal is conducted for the analog luminance signal obtained before A/D conversion, the present invention is not limited by these embodiments and permits gain control to be conducted for the digital luminance signal obtained after the A/D conversion. Alternatively, gain control may be conducted for both the analog luminance signal obtained before A/D conversion and the digital luminance signal obtained after the A/D conversion. Furthermore, although the above embodiments assume color correction based on gain control of the analog chrominance (color difference) signals obtained before A/D conversion, the present invention is not limited by these embodiments and permits gain control of the digital chrominance (color difference) signals obtained after the A/D conversion. Alternatively, gain control may be conducted for both the analog chrominance (color difference) signals obtained before A/D conversion, and the digital chrominance (color difference) signals obtained after the A/D conversion. Besides, although, in the above embodiments, black expansion with a black expansion circuit and color correction with a color matrix circuit are executed along with contrast adjustment and backlight control, the present invention is not limited by these embodiments and may employ the construction where either the black expansion or the color correction is dispensed with or neither is executed. Alternatively, the present invention may be adapted not to have noise reduction means such as noise reduction LPFs.

Moreover, while, in the above embodiments, gain control of an illuminance signal uses a microcomputer 7 and control of a backlight controller uses a backlight control microcomputer 11, gain control of the illuminance signal may use control means independent of the microcomputer 7 and the control of the backlight controller may use control means independent of the backlight control microcomputer 11.

What is claimed is:

1. A display unit driver for an image display apparatus for displaying an image on a display unit in accordance with a video signal, said driver display unit comprising:
    a first controller for feed backing information of an average luminance level and a maximum luminance level obtained from said video signal and feedback-controlling a gain of a luminance signal included in said video signal and adjusting a video contrast; and
    a second controller for controlling an illuminance of backlight applied to a screen of said display unit in accordance with said average luminance level information feed backed and used for controlling the gain of said luminance signal in said first controller;
    wherein a cycle time of the control signal output from said second controller to control the illuminance of the backlight is longer than a cycle time of the control signal output from said first controller to control said luminance signal.

2. The display unit driver according to claim 1, wherein said second controller increases the illuminance of the backlight when the feed backed average luminance level is higher than an upper-limit value of a previously set reference range, and reduces the illuminance of the backlight when the feed backed average luminance level is lower than a lower-limit value of the reference range.

3. The display unit driver according to claim 2, wherein said first controller identifies a luminance region corresponding to a maximum luminance level during a required period, and a luminance region corresponding to an average luminance level during said required period, and feed backs information of both luminance regions identified and feedback controls the gain of said luminance signal, and further changes a gain of a chrominance signal and corrects a color density of the image displayed on said display unit, in accordance with the information of both luminance regions identified.

4. The display unit driver according to claim 3, wherein said second controller is a feed-forward control system.

5. A display unit driver for an image display apparatus for displaying an image on a display unit in accordance with a video signal, said display unit driver comprising:
    a luminance level detector for detecting a maximum luminance level, and an average luminance level, of a luminance signal included in said video signal during a required period;
    a first microcomputer for identifying a first luminance region corresponding to said detected maximum luminance level and a second luminance region corresponding to said detected average luminance level, and controlling a gain of said luminance signal in accordance with information of said first and second luminance regions;
    a backlight controller for controlling an Illuminance of backlight applied to a screen of the display unit; and
    a second microcomputer for controlling said backlight controller in accordance with the information of said second luminance region, in which said second microcomputer increases an illuminance of the backlight when the detected average luminance level is higher than an upper-limit value of a previously set reference range, and reduces the illuminance of the backlight when the detected average luminance level is lower than a lower-limit value of the reference range;
    wherein said first microcomputer feed backs said detected maximum luminance level information and average luminance level information and feedback-controls a gain of said luminance signal and adjusts a video contrast; and
    said second microcomputer controls the illuminance of the backlight in accordance with the feed backed information of said average luminance level;and
    wherein a cycle time of the control signal output from said backlight controller to control the illuminance of the backlight is longer than a cycle time of the control signal output from said first controller to control said luminance signal.

6. The display unit driver according to claim 5, said backlight controller and said second microcomputer are provided in the display unit.

7. An image display apparatus comprising:
    a display unit having a display panel and a backlight, and displaying an image by use of a video signal while backlight is being applied to the display panel; and
    a display unit driver for driving said display unit;
    wherein said display unit driver includes:
    a first controller for feed backing an average luminance level information and a maximum luminance level information obtained from said video signal and feedback-controlling a gain of a luminance signal included in said video signal and adjusting a video contrast; and
    a second controller for controlling an illuminance of backlight applied to a screen of said display unit in accordance with said average luminance level information feed backed and used for controlling the gain of said luminance signal in said first controller;

wherein a cycle time of the control signal output from said controller to control the illuminance of the backlight is longer than a cycle time of the control signal output from said first controller to control said luminance signal.

8. The image display apparatus according to claim 7, wherein said second controller provides control to ensure that:

in a first region where said average luminance level feed backed is higher than the upper-limit value of the reference range, in a first region exceeding the upper-limit value, the illuminance of the backlight is increased as the average luminance level increases;

in a second region where said average luminance level is even higher than in said first region, the illuminance of the backlight is made substantially constant in a first level;

in a third region where said average luminance level is lower than the lower-limit value of the reference range, the illuminance of the backlight is reduced as the average luminance level decreases; and in a fourth region where said average luminance level is even lower than in said third region, the illuminance of the backlight is made substantially constant in a second level which is lower than the first level.

9. An image display apparatus comprising:

a display unit having a display panel and a backlight, and displaying an image by use of a video signal while backlight is applied to the display panel; and a display unit driver for driving said display unit;

wherein said display unit driver includes:

a luminance level detector for detecting a maximum luminance level, and an average luminance level, of a luminance signal included in said video signal during a required period;

a first microcomputer for identifying a first luminance region corresponding to said detected maximum luminance level and a second luminance region corresponding to said detected average luminance level, and controlling a gain of said luminance signal in accordance with information of said first and second luminance regions;

a backlight controller for controlling an illuminance of backlight applied to a screen of said display unit; and a second microcomputer for controlling said backlight controller in accordance with the information of said second luminance region, in which said second microcomputer increases an illuminance of the backlight when the detected average luminance level is higher than an upper-limit value of a previously set reference range, and reduces the illuminance of the backlight when the detected average luminance level is lower than a lower-limit value of the reference range;

wherein said first microcomputer feed backs said detected maximum luminance level information and average luminance level information and feedback-controls a gain of said luminance signal and adjusts a video contrast; and said second microcomputer controls the illuminance of the backlight in accordance with the feed backed information of said average luminance level; and wherein a cycle time of the control signal output from said backlight controller to control the illuminance of the backlight is longer than a cycle time of control signal output from said first controller to control said luminance signal.

10. The image display apparatus according to claim 8, wherein said second controller identifies whether said display unit is configured to irradiate the screen with the backlight, and when the display unit is configured to irradiate the screen with the backlight, controls said first controller to make the illuminance of the backlight controllable.

11. An image display method for displaying an image on a display unit in accordance with a video signal, said image display method comprising the steps of:

detecting an average luminance level and a maximum luminance level of a luminance signal included in said video signal during a required period;

feed backing information of said detected average luminance level and said detected maximum luminance level and controlling a gain of said luminance signal;

comparing said detected average luminance level with a previously set reference range; and controlling an illuminance of the backlight applied to a screen of said display unit to ensure that, as a result of said comparison, when said average luminance level is higher than an upper-limit value of the reference range, said illuminance of the backlight is increased, and when said average luminance level is lower than a lower-limit value of the reference range, said illuminance of the backlight is reduced;

wherein in the step of said controlling an illuminance of the backlight a cycle time of the control signal to control the illuminance of the backlight is longer than a cycle time of the control signal to control the pain of said illuminance signal; and wherein an image is displayed on said display unit in a backlight-applied state.

12. The image display method according to claim 11, wherein in said step of controlling said illuminance of the backlight, it is determined whether said display unit is configured to irradiate a screen with backlight, and in case the determination result indicates that said display unit is configured to irradiate the screen with backlight, said control of said illuminance of the backlight is performed.

* * * * *

UNITED STATES PATENT AND TRADEMARK OFFICE
CERTIFICATE OF CORRECTION

PATENT NO. : 7,333,081 B2  Page 1 of 1
APPLICATION NO. : 10/893989
DATED : February 19, 2008
INVENTOR(S) : Aoki et al.

It is certified that error appears in the above-identified patent and that said Letters Patent is hereby corrected as shown below:

On title page delete Item (76) and insert Item (75) Inventors,

--HIroshl Aoki, Yokohama (JP);
Ryo Hasegawa, Yokohama (JP);
Hirofumi Sakamoto, Yokohama (JP);
Haruki Takata, Yokohama (JP);
Yasutaka Tsuru, Yokohama (JP)--

On title page please add:

Item (73) Assignee,

Hitachi, Ltd., Tokyo (JP)

On title page please add:

Item (74) Attorney, Agent or Firm,

Antonelli, Terry, Stout & Kraus, LLP.

Signed and Sealed this

Sixteenth Day of March, 2010

David J. Kappos
*Director of the United States Patent and Trademark Office*